US012657012B2

(12) United States Patent
Lee et al.

(10) Patent No.: US 12,657,012 B2
(45) Date of Patent: *Jun. 16, 2026

(54) METHOD AND SYSTEM FOR MANAGING INTERMEDIATE REPRESENTATION FROM PROGRAM

(71) Applicants: MOREH CORP., Seoul (KR); Seoul National University R&DB Foundation, Seoul (KR)

(72) Inventors: Jaejin Lee, Seoul (KR); Jungho Park, Seoul (KR); Gangwon Jo, Seoul (KR); Heehoon Kim, Daejeon (KR); Jinpyo Kim, Seoul (KR)

(73) Assignees: MOREH CORP., Seoul (KR); Seoul National University R&DB Foundation, Seoul (KR)

( * ) Notice: Subject to any disclaimer, the term of this patent is extended or adjusted under 35 U.S.C. 154(b) by 221 days.

This patent is subject to a terminal disclaimer.

(21) Appl. No.: 18/542,563

(22) Filed: Dec. 15, 2023

(65) Prior Publication Data

US 2024/0118876 A1 Apr. 11, 2024

Related U.S. Application Data

(63) Continuation of application No. PCT/KR2022/008507, filed on Jun. 15, 2022.

(30) Foreign Application Priority Data

Jun. 16, 2021 (KR) ........................ 10-2021-0077965
Jun. 15, 2022 (KR) ........................ 10-2022-0072639

(51) Int. Cl.
*G06F 8/41* (2018.01)
(52) U.S. Cl.
CPC .................................... *G06F 8/41* (2013.01)

(58) Field of Classification Search
CPC ....................................................... G06F 8/41
(Continued)

(56) References Cited

U.S. PATENT DOCUMENTS 10,540,757 B1 * 1/2020 Bouhnik .................... G06T 3/14
10,776,626 B1 * 9/2020 Lin ........................ G06F 16/583
(Continued)

FOREIGN PATENT DOCUMENTS

KR 10-2006-0004953 A 1/2006
WO 2021-052391 A1 3/2021

OTHER PUBLICATIONS

Duboscq et al, "An Intermediate Representation for Speculative Optimizations in a Dynamic Compiler", ACM, pp. 1-10 (Year: 2013).*
Kunft et al, "An Intermediate Representation for Optimizing Machine Learning Pipelines", ACM, pp. 1-15 (Year: 2019).*
Radu et al, "Towards Multimodal Deep Learning for Activity Recognition on Mobile Devices", ACM, pp. 1-5 (Year: 2016).*
(Continued)

*Primary Examiner* — Anil Khatri
(74) *Attorney, Agent, or Firm* — Banner & Witcoff, Ltd.

(57) ABSTRACT

A method for managing an intermediate representation from a program is executed by one or more processors, and includes extracting, from the program, information on data for input and output and information on operation, generating an intermediate representation from the program using the extracted information on data and the extracted information on operation, storing, in a database, a corresponding relationship between the program and the intermediate representation, storing execution information on operation of the intermediate representation, and deleting at least a part of the intermediate representation based on the execution information.

17 Claims, 9 Drawing Sheets

(58) Field of Classification Search
USPC ................................ 717/146–155; 706/25–45
See application file for complete search history.

(56) References Cited

U.S. PATENT DOCUMENTS

| | | | | |
|---|---|---|---|---|
| 10,901,715 | B1 * | 1/2021 | Raiman | G06F 9/4552 |
| 11,461,662 | B1 * | 10/2022 | Zheng | G06N 3/08 |
| 11,467,811 | B1 * | 10/2022 | Durakovic | G06F 8/425 |
| 11,704,562 | B1 * | 7/2023 | Khaitan | G06N 3/063 |
| | | | | 706/25 |
| 11,704,564 | B2 * | 7/2023 | Faivishevsky | G06N 3/08 |
| | | | | 706/25 |
| 11,790,223 | B2 * | 10/2023 | Wang | G06N 3/096 |
| | | | | 706/25 |
| 12,118,460 | B2 * | 10/2024 | Zaidy | G06N 3/105 |
| 12,468,929 | B2 * | 11/2025 | Bogdan | G06N 3/092 |
| 2004/0221277 | A1 | 11/2004 | Owen et al. | |
| 2017/0124452 | A1 | 5/2017 | Tucker et al. | |
| 2021/0295822 | A1 * | 9/2021 | Tomkins | G10L 15/197 |
| 2022/0206765 | A1 | 6/2022 | Geng et al. | |

OTHER PUBLICATIONS

Wang et al, "Vulnerability Feature Extraction Model for Source Code Based on Deep Learning", IEEE, pp. 1-5 (Year: 2021).*

Kamath et al, "Comparative Study between Traditional Machine Learning and Deep Learning Approaches for Text Classification", ACM, pp. 1-12 (Year: 2018).*

Li et al. "The Deep Learning Compiler: A Comprehensive Survey" vol. 1, No. 1, Article . Publication date: Aug. 2020., pp. 1-34.

Geifman "Compilers for Deep Learning: Definition, Pros& Cons, and Popular Examples" Retrieved from the Internet: <URL: <https://deci.ai/blog/graph-compilers>>, printed Dec. 5, 2023, p. 1-28, Apr. 28, 2021.

Reissmann, Nico, et al., RVSDG: An Intermediate Representation for Optimizing Compilers, Norwegian University of Science and Technology, Mar. 17, 2020, 25 pages.

Darte, Alain, et al., Liveness Analysis in Explicitly-Parallel Programs, Proceedings of the 6th International Workshop on Polyhedral Compilation Techniques, Jan. 18, 2016, 10 pages.

Oct. 30, 2025 (KR) Office Action, App No. 10-2022-0133270, 6 pages.

* cited by examiner

PROGRAM
120

INFORMATION
PROCESSING SYSTEM
110

DATABASE
140

INTERMEDIATE
REPRESENTATION
130

```
1   A = torch . Tensor(...)
2   B = torch . Tensor(...)
3   A = A + B
```

600

INTERMEDIATE
REPRESENTATION

610

INTERMEDIATE
REPRESENTATION

620

INTERMEDIATE
REPRESENTATION

630

```
1   A = torch . Tensor(...)
2   B = torch . Tensor(...)
3   A = A + B
```

600

DATABASE    INTERMEDIATE REPRESENTATION    DATABASE    INTERMEDIATE REPRESENTATION 710                720

```
1   A = torch . Tensor(...)
2   B = torch . Tensor(...)
3   A = A + B
```

600

810                                    820

830

```
1   A = torch . Tensor (...)
2   B = torch . Tensor (...)
3   C = torch . Tensor (...)
4   A = A + B
5   D = A * C
6   D = torch . Tensor (...)
```

900

METHOD AND SYSTEM FOR MANAGING INTERMEDIATE REPRESENTATION FROM PROGRAM

CROSS-REFERENCE TO RELATED APPLICATIONS

The present application is a continuation of International Patent Application No. PCT/KR2022/008507, filed Jun. 15, 2022, which is based upon and claims the benefit of priority to Korean Patent Application No. 10-2021-0077965, filed on Jun. 16, 2021, and Korean Patent Application No. 10-2022-0072639, filed on Jun. 15, 2022. The disclosures of the above-listed applications are hereby incorporated by reference herein in their entirety.

TECHNICAL FIELD

The present disclosure relates to a method and system for managing an intermediate representation from a program, and specifically, to a method and system for efficiently managing an intermediate representation by deleting a part of the intermediate representation based on execution information on operation of the intermediate representation.

BACKGROUND

A program may include data and instructions for performing operations on the data. The simplest way to execute the program is to execute given instructions in sequence, but this involves problems such as that optimization techniques is not applicable because it cannot be executed considering future operations.

To solve this problem, instead of executing given instructions in sequence, an intermediate representation with the same meaning as the program can be constructed and can be executed after applying optimization technique on the intermediate representation and converting the same.

However, there is a problem that as newly generated data, operations, etc. are added to the intermediate representation, the intermediate representation may grow indefinitely, causing a shortage of memory to store the same. In addition, if the size of the intermediate representation to be searched during generation or execution of the intermediate representation is too large, the program execution speed may also decrease.

SUMMARY

In order to address one or more problems (e.g., the problems described above and/or other problems not explicitly described herein), the present disclosure provides a method for, a non-transitory computer-readable recording medium storing instructions for, and an apparatus (system) for managing an intermediate representation from a program.

The present disclosure may be implemented in a variety of ways, including a method, an apparatus (system), or a non-transitory computer-readable recording medium storing instructions.

A method for managing an intermediate representation from a program may be executed by one or more processors and may include extracting, from the program, information on data for input and output and information on operation, generating an intermediate representation from the program using the extracted information on data and the extracted information on operation, storing, in a database, a corresponding relationship between the program and the intermediate representation, storing execution information on operation of the intermediate representation, and deleting at least a part of the intermediate representation based on the execution information.

The program may include a deep learning program, and the data of the program may include tensor type data.

The generating the intermediate representation may include generating a plurality of data nodes corresponding to the extracted data, generating an operation node corresponding to the extracted operation, generating an edge from an input data node corresponding to input data of the extracted operation to an operation node corresponding to the extracted operation, and generating an edge from an operation node corresponding to the extracted operation to an output data node corresponding to output data of the extracted operation.

The storing, in the database, the corresponding relationship between the program and the intermediate representation may include storing, in the database, a relationship between the extracted data and the plurality of data nodes.

The storing the execution information on operation of the intermediate representation may include storing information on whether execution occurred or not for the operation of the intermediate representation, selecting, from among operations of the intermediate representation, at least a part of unexecuted operation as an operation to be executed, executing the selected operation, and updating information so as to include information that the selected operation is executed.

The deleting at least the part of the intermediate representation may include selecting, based on the execution information, at least one node from among the plurality of data nodes and the operation node as a node not to be used in future, and deleting the selected at least one node.

The deleting at least the part of the intermediate representation may include deleting an edge associated with the selected at least one node.

The at least one node may include a first data node, and May be a node that has no data included in the database corresponding to the first data node, or a node that has no operation node associated with the first data node or only has executed operation nodes.

The at least one node may include a first operation node, and the first operation node may be an executed node.

A non-transitory computer-readable recording medium storing instructions for executing a method for managing an intermediate representation from a program on a computer is provided.

An information processing system is provided, which may include a memory, and at least one processor connected to the memory and configured to execute one or more computer-readable programs included in the memory, in which the one or more programs may include instructions for extracting, from a target program, information on data for input and output and information on operation, generating an intermediate representation from the target program using the extracted information on data and the extracted information on operation, storing, in a database, a corresponding relationship between the target program and the intermediate representation, storing execution information on operation of the intermediate representation, and deleting at least a part of the intermediate representation based on the execution information.

According to some examples of the present disclosure, by deleting nodes and edges associated with the node of the intermediate representations that will not be used in future, the size of the intermediate representation can be prevented from increasing indefinitely as the program is executed, and the memory that stores intermediate representations can be used efficiently, and the speed of the program execution can be maintained.

The effects of the present disclosure are not limited to the effects described above, and other effects not described herein can be clearly understood by those of ordinary skill in the art (referred to as "ordinary technician") from the description of the claims.

BRIEF DESCRIPTION OF THE DRAWINGS

The above and other objects, features and advantages of the present disclosure will be described with reference to the accompanying drawings described below, where similar reference numerals indicate similar elements, but not limited thereto, in which.

DETAILED DESCRIPTION

Figure 1:
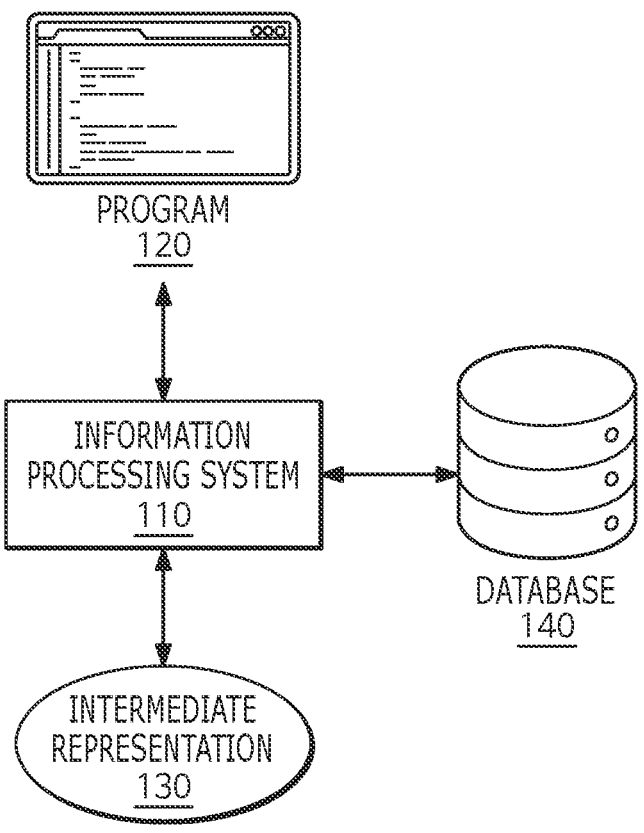
FIG. 1 is a diagram illustrating an example of a method for managing an intermediate representation by an information processing system.

Hereinafter, example details for the practice of the present disclosure will be described in detail with reference to the accompanying drawings. However, in the following description, detailed descriptions of well-known functions or configurations will be omitted if it may make the subject matter of the present disclosure rather unclear.

In the accompanying drawings, the same or corresponding components are assigned the same reference numerals. In addition, in the following description of various examples, duplicate descriptions of the same or corresponding components may be omitted. However, even if descriptions of components are omitted, it is not intended that such components are not included in any example.

Advantages and features of the disclosed examples and methods of accomplishing the same will be apparent by referring to examples described below in connection with the accompanying drawings. However, the present disclosure is not limited to the examples disclosed below, and may be implemented in various forms different from each other, and the examples are merely provided to make the present disclosure complete, and to fully disclose the scope of the disclosure to those skilled in the art to which the present disclosure pertains. The terms used herein will be briefly described prior to describing the disclosed example(s) in detail. The terms used herein have been selected as general terms which are widely used at present in consideration of the functions of the present disclosure, and this may be altered according to the intent of an operator skilled in the art, related practice, or introduction of new technology. In addition, in specific cases, certain terms may be arbitrarily selected by the applicant, and the meaning of the terms will be described in detail in a corresponding description of the example(s). Therefore, the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it is intended as meaning that the portion may additionally comprise (or include or have) another component, rather than excluding the same, unless specified to the contrary.

Further, the term "module" or "part" used herein refers to a software or hardware component, and "module" or "part" performs certain roles. However, the meaning of the "module" or "part" is not limited to software or hardware. The "module" or "part" may be configured to be in an addressable storage medium or configured to play one or more processors. Accordingly, as an example, the "module" or "part" may include components such as software components, object-oriented software components, class components, and task components, and at least one of processes, functions, attributes, procedures, subroutines, program code segments, drivers, firmware, micro-codes, circuits, data, database, data structures, tables, arrays, and variables. Furthermore, functions provided in the components and the "modules" or "parts" may be combined into a smaller number of components and "modules" or "parts", or further divided into additional components and "modules" or "parts."

The "module" or "part" may be implemented as a processor and a memory. The "processor" should be interpreted broadly to encompass a general-purpose processor, a Central Processing Unit (CPU), a microprocessor, a Digital Signal Processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination for processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EE- PROM), flash memory, magnetic or optical data storage, registers, and so on. The memory is said to be in electronic communication with a processor if the processor can read information from and/or write information to the memory. The memory integrated with the processor is in electronic communication with the processor.

In the present disclosure, a "system" may refer to at least one of a server apparatus and a cloud apparatus, but is not limited thereto. For example, the system may include one or more server apparatus. In another example, the system may include one or more cloud apparatus. In still another example, the system may include both the server apparatus and the cloud apparatus operated in conjunction with each other.

In the present disclosure, "each of a plurality of A" may refer to each of all components included in the plurality of A, or may refer to each of some of the components included in a plurality of A.

In the present disclosure, an "intermediate representation" may refer to a graph that is generated to efficiently execute a program and has the same meaning as a program and/or information associated therewith. The intermediate representation may include one or more nodes and one or more edges.

In some examples of the present disclosure, "generating an intermediate representation" or "adding a node or edge to an intermediate representation" may include storing or updating information associated with the intermediate representation in a memory of an information processing system, etc.

In some examples of the present disclosure, "storing to a database" may include storing specific information in a database or updating specific information stored in a database.

FIG. 1 is a diagram illustrating an example of a method for managing an intermediate representation 130 by an information processing system 110. The information processing system 110 may extract information from a program 120 and generate the intermediate representation 130 from the program 120, and store and/or update, in a database 140, the corresponding relationship between the program 120 and the intermediate representation 130. In addition, the information processing system 110 may store and/or update execution information on operation of the intermediate representation 130, and delete a part of the intermediate representation 130 based on the execution information, thereby efficiently managing the intermediate representation 130.

The information processing system 110 may extract, from the program 120, information on data and information on operation. For example, the information processing system 110 may extract, from the program 120, the information on data such as generation of a new variable or constant, definition and change of variable or constant value, data type of variable or constant, size of variable or constant, deletion or destruction of variable or constant. In addition, the information processing system 110 may extract the information on operation, such as the types of operations being performed, information on input and output data of the operations, parameters of the operations, etc. The program 120 may include a deep learning program, and the data may include tensor type data. The information processing system 110 may extract information on the data type, size of each dimension, etc. from the tensor type data included in the deep learning program.

The information processing system 110 may generate (and update) the intermediate representation 130 from the program 120 using the information extracted from the program 120. The intermediate representation 130 may be represented in the form of a graph including nodes and edges. In the intermediate representation 130 represented in the form of a graph, data and operations extracted from the program 120 may be represented as nodes, and the input and output relationship between the data and operations may be represented as edges. In addition, the information processing system 110 may store and update the corresponding relationship between the program 120 and the intermediate representation 130 in the database 140.

For example, the information processing system 110 may extract information on tensor and information on operation from the deep learning program 120. If a new tensor is generated in the program 120, the information processing system 110 may add a data node corresponding to the corresponding tensor to the intermediate representation 130, and may store, in the database 140, the corresponding relationship between the tensor of the program 120 and the data node of the intermediate representation 130. In addition, if the tensor is updated to a new tensor in the program 120, the intermediate representation 130 and/or the corresponding relationship stored in the database 140 may be updated. If the information on operation (information on the types of operations, the input/output tensor, etc.) is extracted from the program 120, an operation node may be added to the intermediate representation 130, and an edge representing the input/output relationship between the tensor and the operation may be added.

The information processing system 110 may execute the intermediate representation 130 generated and updated as described above, and store and update the execution information, that is, the information on whether execution occurred or not. For example, in response to adding the operation node to the intermediate representation 130, the information processing system 110 may store, in the database 140, information that the corresponding operation is not executed. Additionally or alternatively, the information on whether execution occurred or not may be stored in the intermediate representation 130 in association with the operation node of the intermediate representation 130. After executing at least some of the unexecuted operations of the intermediate representation 130, the information processing system 110 may update the information on whether execution occurred or not for the corresponding operation(s) stored in the database 140 and/or the intermediate representation 130.

The information processing system 110 may delete a part of the intermediate representation 130 that will not be used in future execution, based on the information on whether execution occurred or not described above. For example, among a plurality of data nodes and a plurality of operation nodes of the intermediate representation 130, the information processing system 110 may delete a node that will not be used in future based on the information on whether execution occurred or not. An example of a method for determining whether a node will not be used in future will be described in detail below with reference to FIG. 5. Additionally, the information processing system 110 may delete the information associated with the deleted node. For example, the information processing system 110 may additionally delete the edges of the intermediate representation 130 associated with the deleted node, the information on whether execution occurred or not, etc.

In this way, by deleting the part that will not be used in the execution of the intermediate representation 130, the size of the intermediate representation 130 can be prevented from increasing indefinitely with the execution of the program 120, such that is is possible to use the memory storing the intermediate representation 130 efficiently. In addition, the size of the intermediate representation 130 to be searched is reduced, and speed of the execution of the program 120 can be maintained.

Figure 2:
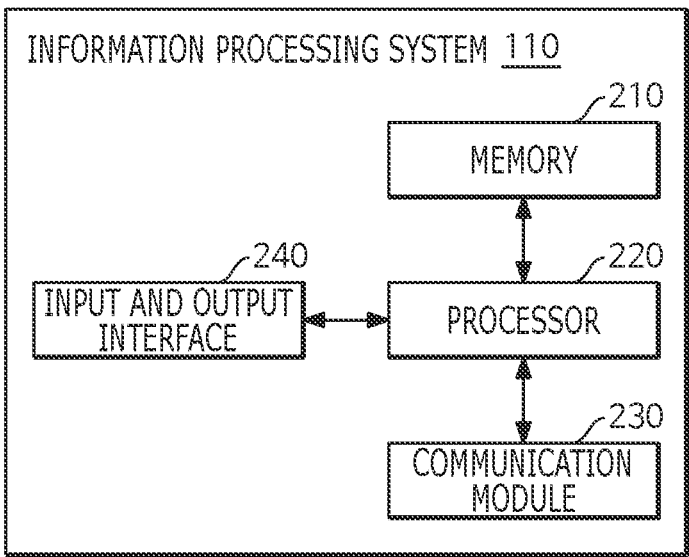
FIG. 2 is a block diagram illustrating an internal configuration of an information processing system.

FIG. 2 is a block diagram illustrating an internal configuration of the information processing system 110. The information processing system 110 may include a memory 210, a processor 220, a communication module 230, and an input and output interface 240. As illustrated in FIG. 2, the information processing system 110 may be configured to communicate information and/or data through a network by using the communication module 230.

The memory 210 may include any non-transitory computer-readable recording medium. The memory 210 may include a permanent mass storage device such as random access memory (RAM), read only memory (ROM), disk drive, solid state drive (SSD), flash memory, etc. In another example, a non-destructive mass storage device such as ROM, SSD, flash memory, disk drive, etc. may be included in the information processing system 110 as a separate permanent storage device that is distinct from the memory. In addition, the memory 210 may store an operating system and at least one program code (e.g., code installed and driven in the information processing system 110 for generating and updating intermediate representations, executing intermediate representations, managing information on whether execution occurred or not for intermediate representations, deleting intermediate representations, etc.).

These software components may be loaded from a computer-readable recording medium separate from the memory 210. Such a separate computer-readable recording medium may include a recording medium directly connectable to the information processing system 110, and may include a computer-readable recording medium such as a floppy drive, a disk, a tape, a DVD/CD-ROM drive, a memory card, etc., for example. In another example, the software components may be loaded into the memory 210 through the communication module 230 rather than the computer-readable recording medium. For example, at least one program may be loaded into the memory 210 based on a computer program (e.g., program for generating and updating intermediate representations, executing intermediate representations, managing information on whether execution occurred or not for intermediate representations, deleting intermediate representations, etc.) installed by files provided through the communication module 230 by a developer or a file distribution system that distributes application installation files.

The processor 220 may be configured to process the instructions of the computer program by performing basic arithmetic, logic, and input and output operations. The commands may be provided to a user terminal (not illustrated) or another external system by the memory 210 or the communication module 230. For example, the processor 220 may extract, from a program to be executed, the information on data for input and output and the information on operation, and generate an intermediate representation using the extracted information, and store, in a database, a corresponding relationship between the program to be executed and the intermediate representation. In addition, in response to executing the operations of the intermediate representation, the processor 220 may store the execution information on operation of the intermediate representation and delete a part of the intermediate representation based on the execution information.

The communication module 230 may provide a configuration or function for the user terminal (not illustrated) and the information processing system 110 to communicate with each other through a network, and may provide a configuration or function for the information processing system 110 to communicate with an external system (e.g., a separate cloud system). For example, control signals, commands, data, and the like provided under the control of the processor 220 of the information processing system 110 may be transmitted to the user terminal and/or the external system through the communication module 230 and the network through the communication module of the user terminal and/or an external system. For example, the user terminal and/or an external system may receive program execution results, etc. from the information processing system 110.

In addition, the input and output interface 240 of the information processing system 110 may be a means for interfacing with an apparatus (not illustrated) for inputting or outputting, which may be connected to the information processing system 110 or included in the information processing system 110. In FIG. 2, the input and output interface 240 is illustrated as a component configured separately from the processor 220, but aspects are not limited thereto, and the input and output interface 240 may be configured to be included in the processor 220. The information processing system 110 may include more components than those illustrated in FIG. 2. Meanwhile, most of the related components may not necessarily require exact illustration.

The processor 220 of the information processing system 110 may be configured to manage, process, and/or store the information and/or data received from a plurality of user terminals and/or a plurality of external systems. The processor 220 may receive information on a program to be executed from a user terminal and/or an external system. In this case, the processor may extract, from a program to be executed, the information on data for input and output and the information on operation, generate an intermediate representation using the extracted information, and store, in a database, a corresponding relationship between the program to be executed and the intermediate representation. In addition, in response to executing the operations of the intermediate representation, the processor 220 may store the execution information on operation of the intermediate representation and delete a part of the intermediate representation based on the execution information. Additionally, the processor 220 may complete execution of the program and transmit the execution result, etc. to the user terminal and/or the external system.

Figure 3:
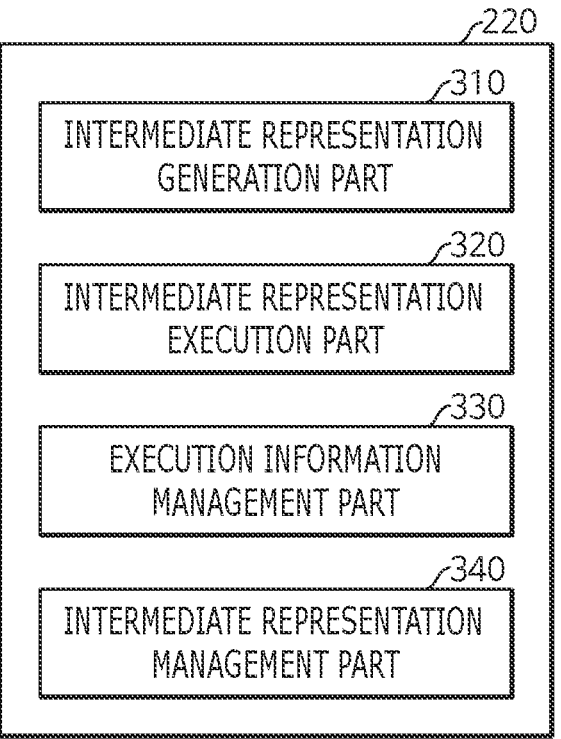
FIG. 3 is a block diagram illustrating an internal configuration of a processor.

FIG. 3 is a block diagram illustrating an internal configuration of the processor 220. As illustrated, the processor 220 may include an intermediate representation generation part 310, an intermediate representation execution part 320, an execution information management part 330, and an intermediate representation management part 340. While only one processor is illustrated in FIG. 3, aspects are not limited thereto, and there may be a plurality of processors. In addition, FIG. 3 illustrate that the intermediate representation generation part 310, the intermediate representation execution part 320, the execution information management part 330, and the intermediate representation management part 340 are separated, but aspects are not limited thereto, and at least a part of each part may be implemented as a single part, or may be implemented as a plurality of subparts.

The intermediate representation generation part 310 may extract, from the program, the information on data and the information on operation. For example, the intermediate representation generation part 310 may extract, from the program, the information on data such as generation of a new variable or constant, definition and change of variable or constant value, data type of variable or constant, size of variable or constant, deletion or destruction of variable or constant. In addition, the intermediate representation generation part 310 may extract the information on operation, such as the types of operations being performed, information on input and output data of the operations, parameters of the operations, etc. For example, the program may refer to any program that includes data and operations, and may include a deep learning program, etc., for example. In addition, the data may be implemented as any data type that may construct a (deep learning) program, and may include, for example, tensor type data, etc. The intermediate representation generation part 310 may extract information on the data type, size of each dimension, etc. from the tensor type data included in the deep learning program.

The intermediate representation generation part 310 may generate an intermediate representation using the information extracted from the program, and store or update the generated intermediate representation. The intermediate representation may be represented in the form of a graph including nodes representing the data and the operations, and edges representing the input/output relationships between the data and the operations. The intermediate representation may be stored in a memory of an information processing system, a database, etc., although aspects are not limited thereto.

Additionally, the intermediate representation generation part 310 may store and/or update the corresponding relationship between the program and the intermediate representation in the database. The process of storing or updating the corresponding relationship between the program and the intermediate representation by the intermediate representation generation part 310 may be performed simultaneously, in parallel, or sequentially with the process of generating, storing, or updating the intermediate representation.

For example, if information in which a new tensor is generated is extracted from a deep learning program, the intermediate representation generation part 310 may add a data node corresponding to the generated tensor to the intermediate representation, and store, in the database, information that the tensor of the generated program corresponds to the data node of the added intermediate representation. In addition, if the intermediate representation generation part 310 extracts, from the deep learning program, information in which the tensor is updated to a new tensor, the intermediate representation generation part 310 may add a new data node to the intermediate representation, and modify the corresponding relationship so that the updated tensor of the program corresponds to the added data node of the intermediate representation. In other words, the corresponding relationship between the program and the intermediate representation may be updated.

As another example, if the information on operation is extracted from the program, the intermediate representation generation part 310 may add an operation node to the intermediate representation, and add an edge from the input data node corresponding to the input data of the extracted operation to the operation node, and an edge from the operation node to the output data node corresponding to the output data of the operations.

If the operation node is added to the intermediate representation, information that the corresponding operation node is not yet executed may be stored in the database by the intermediate representation generation part 310 and/or the execution information management part 330. Additionally or alternatively, the non-execution information may be stored in association with the intermediate representation in a memory, etc., or the non-execution information may not be stored. The non-storage of the non-execution information may indicate that the corresponding operation node is not executed until the information about the operation node having been executed is stored by the intermediate representation execution part 320 and/or the execution information management part 330. An example of the process of generating, storing, and updating an intermediate representation by the intermediate representation generation part 310, and storing and updating, in a database, the corresponding relationship will be described in detail below with reference to FIGS. 6, 7, and 9.

The intermediate representation execution part 320 may execute the intermediate representation generated, stored, or updated by the intermediate representation generation part 310. For example, the intermediate representation execution part 320 may sequentially execute at least some of the part of the intermediate representation that is not executed yet. Additionally, the intermediate representation execution part 320 may actually execute the unexecuted operation node, and store or update the information on whether execution occurred or not so as to include information about the corresponding operation node having been executed. Alternatively, storing or updating the information on whether execution occurred or not for the operation node may be performed by the execution information management part 330.

The execution information management part 330 may store and update the information on whether execution occurred or not for the intermediate representation. For example, before the operation node is added to the intermediate representation and the corresponding node is executed, the execution information management part 330 may store, in a database, information that the corresponding node is not executed yet or store the information in a memory, etc. in association with the intermediate representation. In addition, after the operation node is actually executed, the information on whether execution occurred or not may be updated to include information about the corresponding node having been executed.

The intermediate representation management part 340 may delete at least part of the intermediate representation based on the execution information. For example, from among a plurality of data nodes and operation nodes in the intermediate representation, a node that will not be used in future execution of the program may be selected and the selected node may be deleted. Additionally, the intermediate representation management part 340 may also delete the edges associated with the deleted node.

The data nodes that will not be used in future may include a node that has no data in the database corresponding to that node, or a node that has no operation nodes associated with that node or only has the executed operation nodes. This is because if there is data corresponding to the data node or if there is an unexecuted operation node associated with the data node, there is a possibility that the node may be used in future.

The operation nodes that will not be used in future may include executed operation nodes. This is because unexecuted operation nodes may be executed in future by the intermediate representation execution part 320. When deleting an operation node, the intermediate representation management part 340 may also delete the information on whether execution occurred or not associated with the corresponding operations. An example of the process of selecting and deleting by the intermediate representation management part 340 at least part of the intermediate representation that will not be used in future will be described in detail below with reference to FIGS. 5, 8, and 9.

The internal configuration of the processor 220 illustrated in FIG. 3 is merely an example, and in some examples, configurations other than the illustrated internal configuration may be additionally included, some configurations may be omitted, and some processes may be performed by other configurations or external systems. For example, if the execution information management part 330 is omitted, the non-execution information may be stored by the intermediate representation generation part 310, and the execution information may be updated by the intermediate representation execution part 320. In addition, although the internal components of the processor 220 are described separately for each function in FIG. 3, it does not necessarily mean that they are physically separated.

Figure 4:
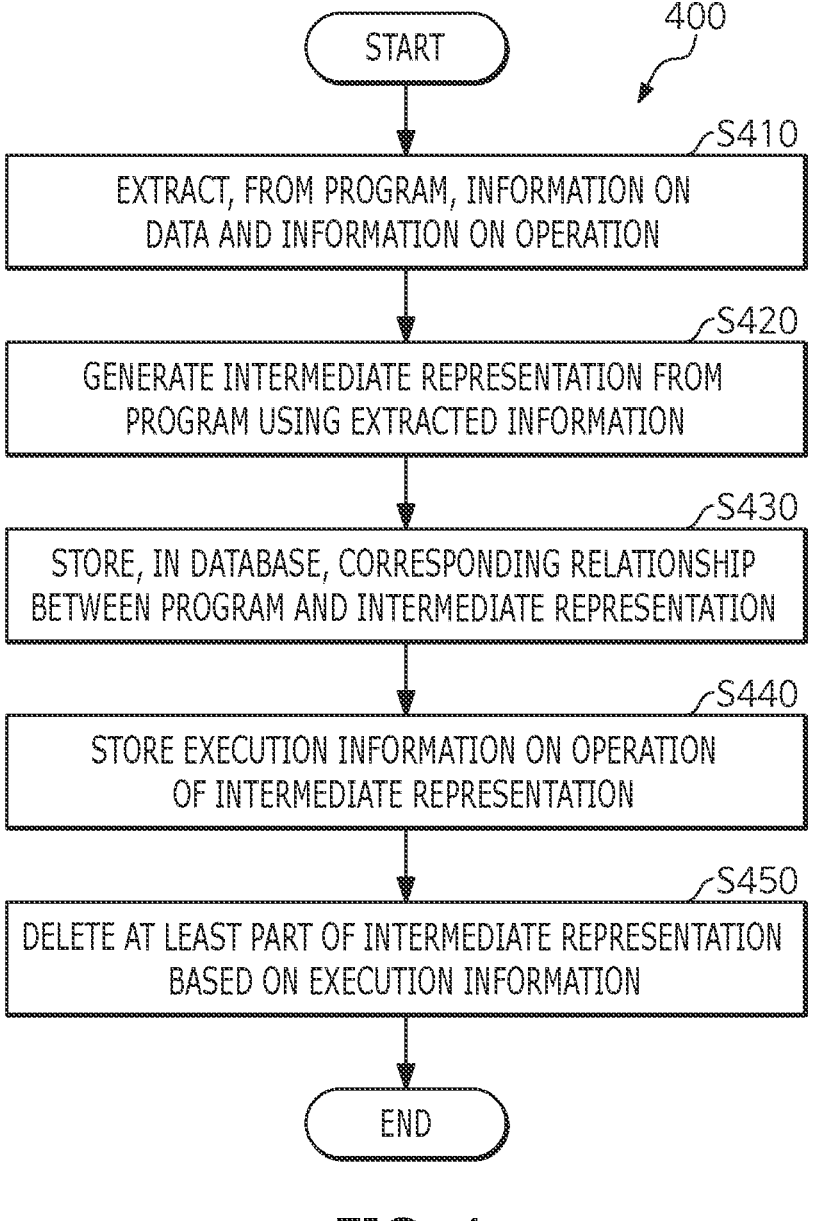
FIG. 4 is a flowchart illustrating an example of a method for managing an intermediate representation from a program.

FIG. 4 is a flowchart illustrating an example of a method 400 for managing an intermediate representation from a program. As illustrated, the method 400 may be initiated by a processor (e.g., the processor 220 of the information processing system 110) extracting, from a program, the information on data and the information on operation, at S410. The program may include a deep learning program, and the data of the program may include tensor type data.

The processor may generate an intermediate representation from the program, using the extracted information on data and the extracted information on operation, at S420. The intermediate representation may be represented as a graph including data nodes, operation nodes, and edges, and the edges may represent the input and output relationship of the data and the operations. For example, the processor may generate a data node corresponding to the data extracted from the program and an operation node corresponding to the operation extracted from the program. In addition, the processor may generate an edge from an input data node corresponding to the input data of the extracted operation to an operation node corresponding to the extracted operation. Likewise, the processor may generate an edge from an operation node corresponding to the extracted operation to an output data node corresponding to output data of the extracted operation.

The processor may store, in a database, the corresponding relationship between the program and the intermediate representation, at S430. For example, the processor may store, in a database, the corresponding relationship between the extracted data and a plurality of data nodes of the intermediate representation, and if the corresponding relationship changes, may update the corresponding relationship stored in the database.

In addition, the processor may store the execution information on operation of the intermediate representation, at S430. The processor may store the information on whether execution occurred or not for the operations of the intermediate representation. For example, in response to the operation node being added to the intermediate representation, information on the corresponding operation not yet executed may be stored. In addition, the processor may select the unexecuted operation of the operations of the intermediate representation as the operation to be executed, execute the selected operation, and store or update information about the corresponding operation having been executed. The information on whether execution occurred or not for the operations may be stored in a database, or may be stored in the memory of the information processing system, etc. in association with the intermediate representation.

The processor may delete at least part of the intermediate representation based on the execution information, at S450. If there is at least one node that will not be used in future among a plurality of data nodes and operation nodes included in the intermediate representation based on the execution information, the processor may select the corresponding node as a node that will not be used in future, and delete the selected node. Additionally, the processor may also delete the edges associated with the deleted node. In addition, if the deleted node is an operation node, the information on whether execution occurred or not associated with the operation node may also be deleted.

The flowchart illustrated in FIG. 4 and the above description are merely examples, and may be implemented differently in some other examples. For example, one or more operations may be omitted or implemented by a different configuration, the order of operations may be changed, one or more operations may be performed simultaneously or in parallel, or one or more operations may be performed repeatedly multiple times.

Figure 5:
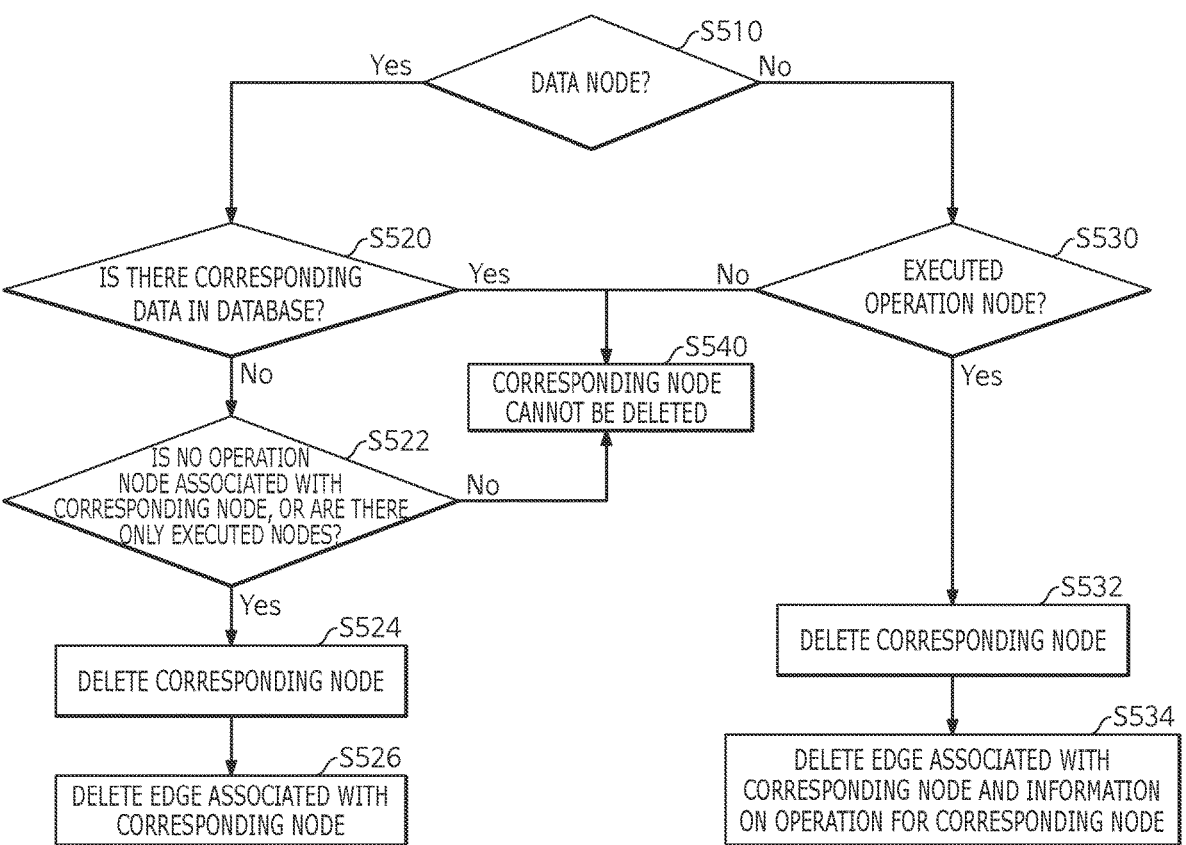
FIG. 5 is a flowchart illustrating an example of a method for selecting and deleting at least a part of an intermediate representation that will not be used in future.

FIG. 5 is a flowchart illustrating an example of a method for selecting and deleting at least a part of intermediate representation that will not be used in future. The processor may select, from among a plurality of data nodes and operation nodes of the intermediate representation, a node that will not be used in future execution of the program and delete the corresponding node. For example, the data nodes that will not be used in future may include a data node that has no data in the database corresponding to that data node, and has no operation node (e.g., no preceding operation node corresponding thereto, no operation node that receives the data node as input) associated with that data node or only has the executed operation nodes. This is because if there is data corresponding to the data node or if there is an unexecuted operation node associated with the data node, there is a possibility that the data node may be used in future. In addition, the operation nodes that will not be used in future may include executed operation nodes. This is because the unexecuted operation nodes may be executed in future.

The processor may perform the process illustrated in FIG. 5 to search whether a specific node is a node that will not be used in future (i.e., whether deleting the same will not affect future execution of the program).

The processor may determine whether a specific node is a data node, at S510. If it is a data node, it can be determined whether the corresponding node can be deleted through S520 and S522, and if it is an operation node, it can be determined whether the corresponding node can be deleted through S530.

At S510, if it is determined that the corresponding node is a data node, the processor may determine whether data of a program corresponding to the corresponding data node is present in the database, at S520. If there is data of the program corresponding to the corresponding data node, the corresponding data node cannot be deleted because there is a possibility that the corresponding node will be used in future, at S540.

If there is no data of the program corresponding to the corresponding data node, the processor may determine if there are no operation nodes associated with the corresponding node or if all operation nodes were executed, at S522. The operation node associated with the node may include a preceding operation node of the node, and an operation node that receives the corresponding node as input. If there is an operation node associated with the node and if the operation node is a node that is not executed, the corresponding data node cannot be deleted because there is a possibility that the data node will be used when executing the unexecuted operation node in future, at S540.

If there is no operation node associated with the corresponding data node, or if the operation nodes associated with the corresponding data node are all executed nodes, the corresponding data node is a node that is unlikely to be used in future, and accordingly, the processor may delete the corresponding data node, at S524. Additionally, the processor may delete an edge associated with the corresponding data node (e.g., an edge connected to the corresponding data node), at S526.

At S510, if it is determined that the corresponding node is an operation node, the processor may determine whether the corresponding operation node is an executed operation node, at S530. If the corresponding node is an unexecuted operation node, the corresponding node cannot be deleted at S540, because it may be executed later in future. If the corresponding node is an executed operation node, there is no possibility of it being used in future, and accordingly, the processor may delete the corresponding node, at S532. Additionally, the processor may delete an edge associated with the corresponding operation node (e.g., an edge connected to the corresponding operation node), and also delete the information on operation corresponding to the corresponding node (e.g., information on whether execution occurred or not for the corresponding operation node, information on parameters of the corresponding operation, etc.), at S534.

In this way, by deleting part (or all) of the intermediate representation that will not be used in the future execution of the program, the size of the intermediate representation can be prevented from increasing indefinitely as the program is executed, thereby managing the memory storing intermediate representations efficiently. Furthermore, the size of intermediate representation to be searched can be reduced, and the program execution speed can be enhanced.

Figure 6:
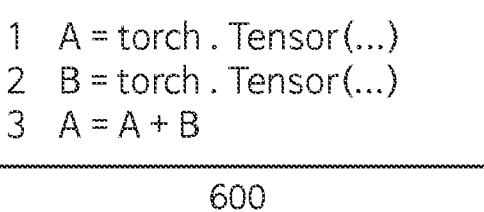
FIG. 6 is a diagram illustrating an example of a process of generating an intermediate representation from a program.

FIG. 6 is a diagram illustrating an example of a process of generating an intermediate representation from a program 600. The information processing system may extract, from the program 600, the information on data and the information on operation, and generate an intermediate representation using the extracted information.

As a specific example, an intermediate representation from the program 600 may be generated through first to third states 610, 620, and 630. The first state 610 represents an example of a state in which the information processing system generates an intermediate representation up to the first line of the program 600. The information processing system may extract information on newly generated tensor A from the first line of the program 600 and add a data node A corresponding to the tensor A to the intermediate representation, as illustrated.

The second state 620 represents an example of a state in which the information processing system generates an intermediate representation up to the second line of the program 600. The information processing system may extract information on newly generated tensor B from the second line of the program 600 and add a data node B corresponding to the tensor B to the intermediate representation, as illustrated.

The information processing system may extract the information on operation from the program 600. In this case, the information processing system may add an operation node corresponding to the operation of the program 600 to the intermediate representation. In addition, the information processing system may add, to the intermediate representation, an edge from a data node corresponding to the input data of the operation to the operation node, and add, to the intermediate representation, an edge from the operation node to a data node corresponding to the output data of the operation so as to represent the input and output relationship between the operation node and the data nod. If the extracted operation is an in-place operation (an operation where all/part of the output data is the same as all/part of the input data), a new output data node may be generated instead of adding edges in both directions between the data nodes and the operation node.

For example, the third state 630 represents an example of a state in which the information processing system generates an intermediate representation up to the third line of the program 600. The information processing system may extract information on "+" operation from the third line of the program 600 and add an operation node "+" corresponding to the "+" operation to the intermediate representation, as illustrated. At this time, the corresponding "+" operation may be included in the in-place operation in which the output data (tensor A) and part of input data (tensor A) are same as each other. As illustrated, the information processing system may add, to the intermediate representation, two edges from data node A and data node B respectively corresponding to tensor A and tensor B which are input data to the operation node "+", add a data node A' corresponding to tensor A which is output data, and add an edge from the operation node "+" to the output data node A' so as to represent the input and output relationship of the operation. That is, instead of adding edges in both directions between the data node A corresponding to tensor A which is the input data as well as the output data of the "+" operation, the information processing system may add output data node A' corresponding to tensor A which is output data, and add an edge from the operation node "+" to the output data node A'. If an intermediate representation for an in-place operation is generated in this way, no loop is generated in the intermediate representation, and the intermediate representation may be managed efficiently thereafter.

Figure 7:
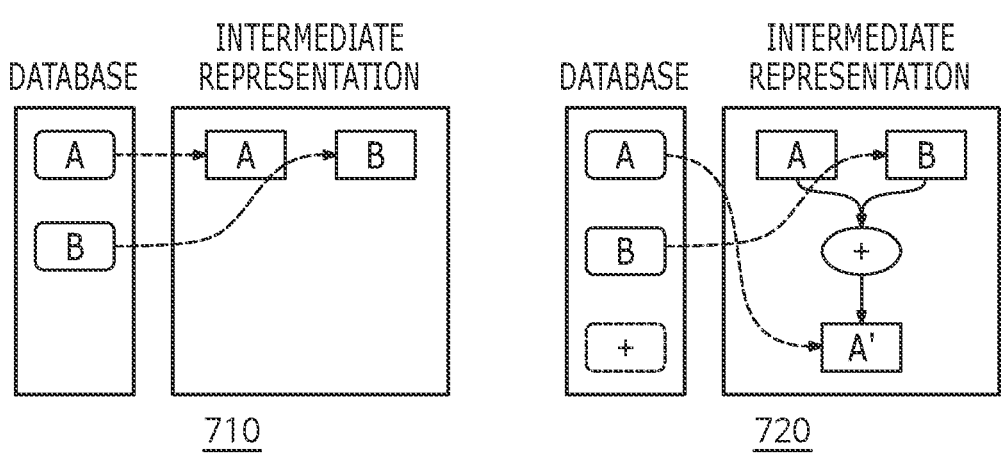
FIG. 7 is a diagram illustrating an example of a process of generating an intermediate representation from a program, and storing and updating, in a database, corresponding relationship between the program and the intermediate representation.

FIG. 7 is a diagram illustrating an example of a process of generating an intermediate representation from the program 600 and storing and updating, in a database, the corresponding relationship between the program 600 and the intermediate representation. The information processing system may generate an intermediate representation from the program 600 and store and update, in a database, the corresponding relationship between the program 600 and the intermediate representation.

As a specific example, an intermediate representation of the program 600 may generated through first to second states 710 and 720, and the corresponding relationship between the program 600 and the intermediate representation may be stored and updated. The first state 710 represents an example of a state in which the information processing system generates an intermediate representation up to the second line of the program, while also storing the corresponding relationship between the program 600 and the intermediate representation in the database. The information processing system may extract information on the newly generated tensor A and tensor B from the first to second lines of the program 600. As illustrated, data node A corresponding to tensor A and data node B corresponding to tensor B may be added to the intermediate representation, and information that tensor A and tensor B of the program 600 correspond to data node A and data node B of the intermediate representation, respectively, may be stored in the database.

The second state 720 represents an example of a state in which the information processing system generates an intermediate representation up to the third line of the program after the first state 710, while also updating the corresponding relationship between the program 600 and the intermediate representation. The information processing system may extract information on "+" operation from the third line of the program 600 and, as described above with reference to FIG. 6, may add, to the intermediate representation, an operation node "+" corresponding to the "+" operation, two edges from data node A and data node B respectively corresponding to the tensor A and the tensor B which are the input data to the operation node "+", and a data node A' corresponding to the tensor A which is the output data. Since the output tensor of the "+" operation is A, after the "+" operation of the program 600 (or the operation node "+" of the corresponding intermediate representation) is executed, the tensor A of the program 600 corresponds to the output data node A' of the operation node "+" of the intermediate representation. Accordingly, the information processing system may update the corresponding relationship stored in the database so as to include information that the tensor A of the program corresponds to the data node A' of the intermediate representation.

Figure 8:
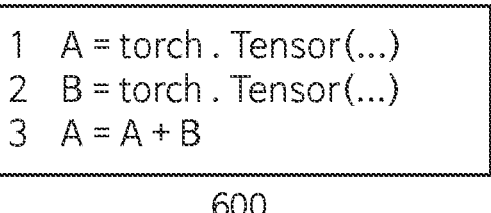
FIG. 8 is a diagram illustrating an example of a process of storing execution information on operation and deleting a part of the intermediate representation based on the execution information.
Figure 8:
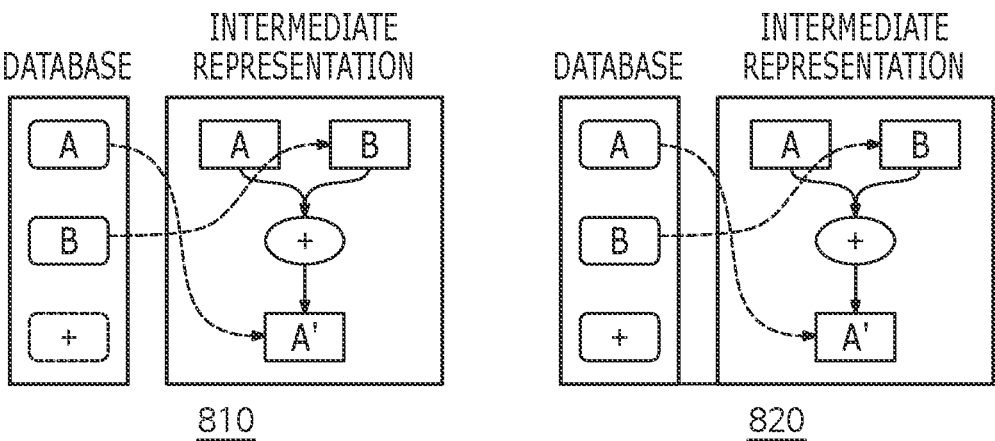
Figure 8:
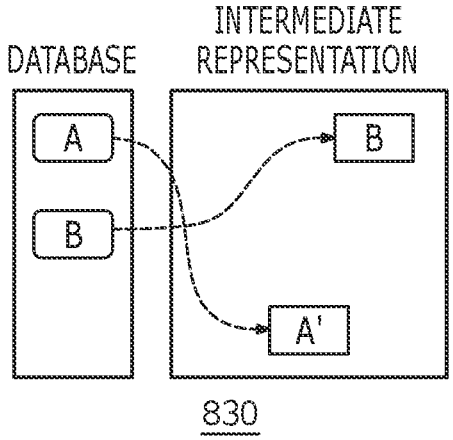

FIG. 8 is a diagram illustrating an example of a process of storing execution information on operation and deleting part of the intermediate representation based on the execution information. The information processing system may store the execution information on operation of the intermediate representation and delete a part of the intermediate representation that will not be used in future based on the execution information.

As a specific example, through first to third states 810, 820, and 830, the execution information on operation may be stored, and a part of the intermediate representation that will not be used in future may be deleted. The first state 810 represents an example of a state in which the information processing system stores the information on whether execution occurred or not. The information processing system may store, in a database, the information that the operation node "+" of the intermediate representation (or the "+" operation of the program) is not yet executed. For example, as illustrated in FIG. 8, the border of the "+" block in the database of the first state 810 may be illustrated as a dotted line, and the operation node illustrated with a dotted line in this way may mean that information that the operation node "+" of the intermediate representation (or the "+" operation of the program) is not yet executed is stored in the database. Alternatively, the information processing system may not store the information that the operation is not yet performed. In this case, this may mean that the corresponding operation is not executed until the information on operation having been executed is stored.

The second state 820 represents an example of a state after the first state 810, in which the information processing system updates the information on whether execution occurred or not for the operations. The information processing system may execute the corresponding operation after confirming that the operation node "+" (or the "+" operation of the program) is not yet executed. The information processing system may update the information on whether execution occurred or not for the "+" operation stored in the database. Alternatively, the process of executing unexecuted operations and storing the execution information of the corresponding operations may be performed by an external system that has access to the database, instead of the information processing system. For example, as illustrated in FIG. 8, the border of the "+" block in the database of the second state 820 may be illustrated as a solid line, and the operation node illustrated by the solid line in this way may mean that information is stored in the database about the operation node "+" of the intermediate representation (or the "+" operation of the program) having been executed.

The third state 830 represents an example of a state after the second state 820, in which the information processing system deletes a node in the intermediate representation that will not be used in future. The information processing system may delete at least a part of the intermediate representation based on the intermediate representation of the second state 820, the corresponding relationship between the intermediate representation and the program stored in the database, and/or the execution information on operation. For example, in the second state 820, since the data node A in the intermediate representation has no data of the corresponding program, and the operation node "+" associated with the corresponding node is already executed, the data node A may be determined to be a node that can be deleted. Accordingly, the information processing system may delete, from the intermediate representation, the data node A, the edges connected to the data node A, and the information associated with the data node A. In the second state 820, the operation node "+" associated with the node is executed, but it may be determined that data node B and data node A' are nodes that cannot be deleted, because the data (tensor B, tensor A) of the program corresponding to the corresponding node is present in the database. In addition, in the second state 820, since the operation node "+" is an executed operation node, it may be determined to be a node that can be deleted. Therefore, the information processing system may delete the operation node "+" and the edges connected to the operation node "+". Furthermore, the information processing system may delete the information associated with operation node "+" (e.g., execution information on operation "+") from the database. Through this determination process, the process may proceed to the third state 830 in which part of the intermediate representation (and information related thereto) that will not be used in future is deleted.

Although FIG. 8 illustrates that the execution information on operation is stored in the database, aspects are not limited thereto, and may be implemented differently in some examples. For example, the execution information on operation may be stored in the memory of the information processing system in association with the intermediate representation.

Figure 9:
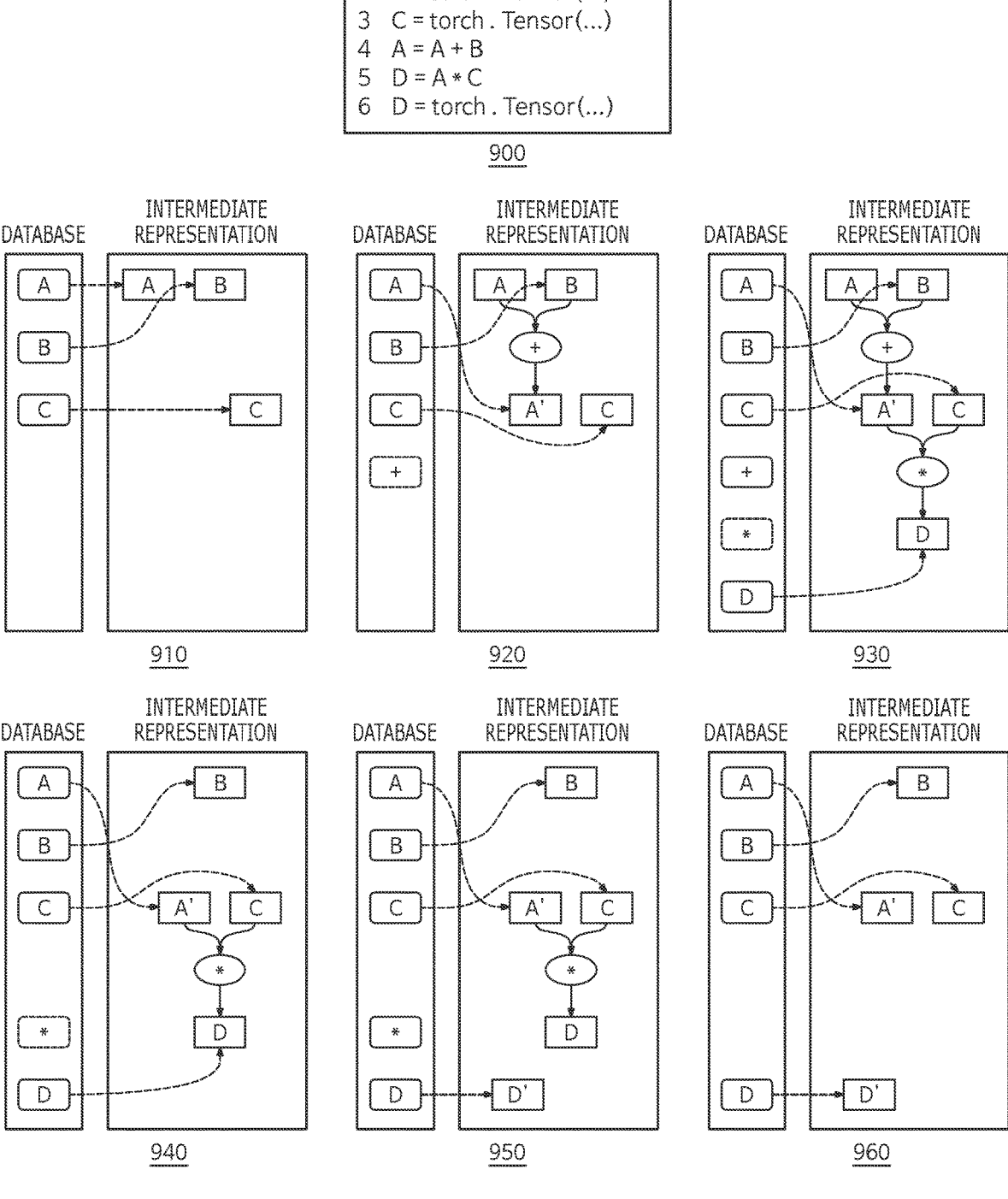
FIG. 9 is a diagram illustrating an example of a method for efficiently managing an intermediate representation from a program.

FIG. 9 is a diagram illustrating an example of a method for efficiently managing an intermediate representation from a program 900. The steps of the method may be performed sequentially or in parallel. FIG. 9 illustrates an example of a process of performing each step of the method in parallel.

To perform a method for efficiently managing the intermediate representation from the program 900, the first to sixth states 910, 920, 930, 940, 950, and 960 may be performed. The first state 910 represents an example of a state in which an intermediate representation from the first to third lines of the program 900 is generated, and the corresponding relationship between the program 900 and the intermediate representation is stored. The information processing system may extract information on the newly generated tensor A, tensor B, and tensor C from the program 900, add, to the intermediate representation, data node A, data node B, and data node C corresponding thereto, and store, in a database, the corresponding relationship between the tensors of the program 900 and the data nodes of the intermediate representation.

The second state 920 represents an example of a state after the first state 910, in which an intermediate representation from the first to the fourth line of the program 900 is generated, the corresponding relationship between the program 900 and the intermediate representation is updated accordingly, and the information on whether execution occurred or not for the operations is stored. The information processing system may extract the information on operation "+" from the fourth line of the program 900, and add, to the intermediate representation, three edges representing the operation node "+", the data node A' corresponding to the output data (tensor A) of the operation, and the input and output relationship of the operation "+". In addition, the corresponding relationship may be updated so as to include information that the tensor A of the program 900 corresponds to the data node A' of the intermediate representation. Additionally, information that the operation node "+" (or the "+" operation of the program) is not yet executed may be stored in the database (the border of the "+" block in the database in the second state 920 is illustrated as a dotted line).

The third state 930 represents an example of a state after the second state 920, in which an intermediate representation from the first to the fifth line of the program 900 is generated, the corresponding relationship between the program 900 and the intermediate representation is stored (or updated), "+" operation is executed, and the execution information on operation is stored and updated. The information processing system may extract information on operation "*" from the fifth line of the program 900, and add, to the intermediate representation, three edges representing the operation node "*", the data node D corresponding to the output data (tensor D) of the operation, and the input and output relationship of the operation "*". In addition, information that the tensor D of the program 900 corresponds to the data node D of the intermediate representation may be stored in the database, and information that the operation "*" is not yet executed may be stored (in the third state 930, the border of the "*" block in the database is illustrated as a dotted line). Additionally, after executing the "+" operation, the information processing system may update the information on whether execution occurred or not for the operation node "+" (in the third state 930, the border of the "+" block in the database is illustrated with a solid line).

The fourth state 940 represents an example of a state after the third state 930, in which a part of intermediate representation that will not be used in future is deleted. In the third state 930, data node A', data node B, data node C, and data node D cannot be deleted because they correspond to tensor A, tensor B, tensor C, and tensor D of the program 900, respectively. In addition, in the third state 930, the operation node "*" cannot be deleted because it is not yet executed. On the other hand, in the third state 930, because the data node A does not correspond to the data of the program and the operation node "+" associated with the node is executed, the data node A may be determined to be a node that will not be used in future. In addition, in the third state 930, since the operation node "+" is the executed operation node, it may be the node that will not be used in future. Accordingly, the information processing system may delete the data node A, the operation node "+", the edges associated with the corresponding nodes, the execution information on operation "+", etc.

The fifth state 950 represents an example of a state in which an intermediate representation from the first to the sixth line of the program 900 is generated, the corresponding relationship between the program 900 and the intermediate representation is updated accordingly, the "*" operation is executed, and the execution information on the corresponding operation is updated after the fourth state 940. The information processing system may extract information that the tensor D is updated to a new tensor in the sixth line of the program 900 and add, to the intermediate representation, data node D' corresponding to the updated tensor D. In addition, the information on the corresponding relationship may be updated so as to include information that the tensor D of the program 900 corresponds to the data node D' of the intermediate representation. Additionally, after executing the "*" operation, the information processing system may update the information on whether execution occurred or not for the operation node "*" (in the fifth state 950, the border of the "*" block in the database is illustrated with a solid line).

The sixth state 960 represents an example of a state after the fifth state 950, in which a part of intermediate representation that will not be used in future is deleted. In the fifth state 950, data node A', data node B, data node C, and data node D' cannot be deleted because they correspond to tensor A, tensor B, tensor C, and tensor D of the program 900, respectively. On the other hand, in the fifth state 950, because the data node D does not correspond to the data of the program and the operation node "*" associated with the corresponding node is executed, the data node D may be determined to be a node that will not be used in future. In addition, in the fifth state 950, since the operation node "*" is the executed operation node, it may be a node that will not be used in future. Accordingly, the information processing system may delete the data node D, the operation node "*", the edges associated with the corresponding nodes, the execution information on operation "*", etc.

The method described above may be provided as a computer program stored in a computer-readable recording medium for execution on a computer. The medium may be a type of medium that continuously stores a program executable by a computer, or temporarily stores the program for execution or download. In addition, the medium may be a variety of writing means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, etc. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies according to design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EE-PROM), flash memory, compact disc (CD), magnetic or optical data storage devices, etc. The instructions may be executable by one or more processors, and may cause the processor(s) to perform certain aspects of the functions described in the present disclosure.

Although the examples described above have been described as utilizing aspects of the currently disclosed subject matter in one or more standalone computer systems, aspects are not limited thereto, and may be implemented in conjunction with any computing environment, such as a network or distributed computing environment. Furthermore, the aspects of the subject matter in the present disclosure may be implemented in multiple processing chips or apparatus, and storage may be similarly influenced across a plurality of apparatus. Such apparatus may include PCs, network servers, and portable apparatus.

Although the present disclosure has been described in connection with some examples herein, various modifications and changes can be made without departing from the scope of the present disclosure, which can be understood by those skilled in the art to which the present disclosure pertains. In addition, such modifications and changes should be considered within the scope of the claims appended herein.

The invention claimed is:

1. A method executed by one or more processors, the method comprising:

determining, information associated with a deep learning program executable by one or more computing devices, wherein the information associated with the deep learning program comprises:

information associated with one or more data elements of the deep learning program, wherein at least one data element of the one or more data elements provides tensor information, and wherein at least one second data element of the one or more data elements indicates data of the deep learning program; and information associated with one or more operations of the deep learning program;

generating, based on the information associated with the deep learning program, an intermediate representation of at least a portion of the deep learning program by:

generating a plurality of data nodes corresponding to the data elements of the deep learning program, wherein the plurality of data nodes comprises at least one input data node and at least one output data node;

generating an operation node corresponding to the one or more operations of the deep learning program;

generating a first edge that links an input data node corresponding to input data associated with at least one of the one or more operations to the operation node; and generating a second edge that links the operation node to an output data node corresponding to output data associated with the at least one of the one or more operations;

storing, in a database, a corresponding relationship between the at least a portion of the deep learning program and the intermediate representation by storing, in the database, a relationship between the data elements and the plurality of data nodes;

executing an optimized form of the deep learning program by executing, based on the intermediate representation, the deep learning program;

storing information indicating an execution status of one or more operations of the deep learning program by:

storing information indicating whether an execution has been performed for at least one of the one or more operations of the intermediate representation;

selecting a first operation to be executed by selecting, from among operations of the intermediate representation, at least a part of unexecuted operation;

executing the first operation; and updating information indicating that the first operation has been executed; and deleting, from memory and based on the execution status, at least a part of the intermediate representation.

2. The method according to claim 1, further comprising:

adding, based on determining that a new tensor was generated by the deep learning program, a new data node to the intermediate representation.

3. The method according to claim 1, further comprising:

updating, based on determining that an existing tensor was generated by the deep learning program, an existing data node of the plurality of data nodes.

4. The method according to claim 1, further comprising:

extracting input tensor information from the deep learning program; and adding, based on the input tensor information, a new operation node to the intermediate representation.

5. The method according to claim 1, wherein the deleting the at least the part of the intermediate representation comprises:

selecting a first data node, from among the plurality of data nodes and the operation node, as a node not to be used in a future execution, wherein the selecting the first data node is based on:

the information indicating the execution status a determination that data corresponding to the first data node is not stored in the database, one or both of:

a determination that no operation node associated with the first data node exists, or a condition that operations of all operation nodes associated with the first data node have been executed; and a determination that the operation node is an executed node;

deleting, from the memory, the first data node; and deleting, from the memory, an edge associated with the first data node.

6. The method according to claim 1, wherein the operation node corresponds to an operation performed on at least two tensors.

7. An information processing system comprising:

Memory; and

One or more processors coupled to the memory and configured to execute one or more computer-readable programs stored in memory, determine, information associated with a deep learning program executable by one or more computing devices, wherein the information associated with the deep learning program comprises:

information associated with one or more data elements of the deep learning program, wherein at least one data element of the one or more data elements provides tensor information, and wherein at least one second data element of the one or more data elements indicates data of the deep learning program; and information associated with one or more operations of the deep learning program;

generate, based on the information associated with the deep learning program, an intermediate representation of at least a portion of the deep learning program by:

generating a plurality of data nodes corresponding to the data elements of the deep learning program, wherein the plurality of data nodes comprises at least one input data node and at least one output data node;

generating an operation node corresponding to the one or more operations of the deep learning program;

generating a first edge that links an input data node corresponding to input data associated with at least one of the one or more operations to the operation node; and generating a second edge that links the operation node to an output data node corresponding to output data associated with the at least one of the one or more operations;

store, in a database, a corresponding relationship between the at least a portion of the deep learning program and the intermediate representation by storing, in the database, a relationship between the data elements and the plurality of data nodes;

execute an optimized form of the deep learning program by executing, based on the intermediate representation, the deep learning program;

storing information indicating an execution status of one or more operations of the deep learning program by:

storing information indicating whether an execution has been performed for at least one of the one or more operations of the intermediate representation;

selecting a first operation to be executed by selecting, from among operations of the intermediate representation, at least a part of unexecuted operation;

executing the first operation; and updating information indicating that the first operation has been executed; and delete, from memory and based on the execution status, at least a part of the intermediate representation.

8. The information processing system according to claim 7, wherein the instructions, when executed by the one or more processors, further cause the information processing system to:

add, based on determining that a new tensor was generated by the deep learning program, a new data node to the intermediate representation.

9. The information processing system according to claim 7, wherein the instructions, when executed by the one or more processors, further cause the information processing system to:

update, based on determining that an existing tensor was generated by the deep learning program, an existing data node of the plurality of data nodes.

10. The information processing system according to claim 7, wherein the instructions, when executed by the one or more processors, further cause the information processing system to:

extract input tensor information from the deep learning program; and add, based on the input tensor information, a new operation node to the intermediate representation.

11. The information processing system according to claim 7, wherein the instructions, when executed by the one or more processors, cause the information processing system to delete the at least the part of the intermediate representation by causing the information processing system to:

select a first data node, from among the plurality of data nodes and the operation node, as a node not to be used in a future execution, wherein the selecting the first data node is based on:

the information indicating the execution status a determination that data corresponding to the first data node is not stored in the database, one or both of:

a determination that no operation node associated with the first data node exists, or a condition that operations of all operation nodes associated with the first data node have been executed; and a determination that the operation node is an executed node;

delete, from the memory, the first data node; and delete, from the memory, an edge associated with the first data node.

12. The information processing system according to claim 7, wherein the operation node corresponds to an operation performed on at least two tensors.

13. One or more non-transitory computer-readable media storing instruction that when execute by one or more processors of an information processing system cause the information processing system to:

determine, information associated with a deep learning program executable by one or more computing devices, wherein the information associated with the deep learning program comprises:

information associated with one or more data elements of the deep learning program, wherein at least one data element of the one or more data elements provides tensor information, and wherein at least one second data element of the one or more data elements indicates data of the deep learning program; and information associated with one or more operations of the deep learning program;

generating, based on the information associated with the deep learning program, an intermediate representation of at least a portion of the deep learning program by:

generating a plurality of data nodes corresponding to the data elements of the deep learning program, wherein the plurality of data nodes comprises at least one input data node and at least one output data node;

generating an operation node corresponding to the one or more operations of the deep learning program;

generating a first edge that links an input data node corresponding to input data associated with at least one of the one or more operations to the operation node; and generating a second edge that links the operation node to an output data node corresponding to output data associated with the at least one of the one or more operations;

storing, in a database, a corresponding relationship between the at least a portion of the deep learning program and the intermediate representation by storing, in the database, a relationship between the data elements and the plurality of data nodes;

execute an optimized form of the deep learning program by executing, based on the intermediate representation, the deep learning program;

store information indicating an execution status of one or more operations of the deep learning program by:

storing information indicating whether an execution has been performed for at least one of the one or more operations of the intermediate representation;

selecting a first operation to be executed by selecting, from among operations of the intermediate representation, at least a part of unexecuted operation;

executing the first operation; and updating information indicating that the first operation has been executed; and delete, from memory and based on the execution status, at least a part of the intermediate representation by:

selecting a first data node from among the plurality of data nodes and the operation node, as a node not to be used in a future execution, wherein the selecting the first data node is based on:

the information indicating the execution status, a determination that data corresponding to the data node is not stored in the database, one or both of:

a determination that no operation node associated with first data node exists, or a condition that operations of all operation nodes associated with the first data node have been executed; and a determination that the operation node is an executed node;

deleting from the memory, the first data node; and deleting form the memory, an edge associated with the first data node.

14. The one or more non-transitory computer-readable media according to claim 13, wherein the instructions, when executed by the one or more processors, further cause the information processing system to:

add, based on determining that a new tensor was generated by the deep learning program, a new data node to the intermediate representation.

15. The one or more non-transitory computer-readable media according to claim 13, wherein the instructions, when executed by the one or more processors, further cause the information processing system to:

update, based on determining that an existing tensor was generated by the deep learning program, an existing data node of the plurality of data nodes.

16. The one or more non-transitory computer-readable media according to claim 13, wherein the instructions, when executed by the one or more processors, further cause the information processing system to:

extract input tensor information from the deep learning program; and add, based on the input tensor information, a new operation node to the intermediate representation.

17. The one or more non-transitory computer-readable media according to claim 13, wherein the instructions, when executed by the one or more processors, cause the information processing system to delete the at least the part of the intermediate representation by causing the information processing system to:

select a first data node, from among the plurality of data nodes and the operation node, as a node not to be used in a future execution, wherein the selecting the first data node is based on:

the information indicating the execution status a determination that data corresponding to the first data node is not stored in the database, one or both of:

a determination that no operation node associated with the first data node exists, or a condition that operations of all operation nodes associated with the first data node have been executed; and a determination that the operation node is an executed node;

delete, from the memory, the first data node; and delete, from the memory, an edge associated with the first data node.

* * * * *